United States Patent
Sanders

(10) Patent No.: US 11,193,897 B2
(45) Date of Patent: Dec. 7, 2021

(54) METHODS AND SYSTEMS FOR MOUNTING INSPECTION DEVICES

(71) Applicant: Honda Motor Co., Ltd., Tokyo (JP)

(72) Inventor: Drew M Sanders, Troy, OH (US)

(73) Assignee: Honda Motor Company, Ltd., Tokyo (JP)

( * ) Notice: Subject to any disclaimer, the term of this patent is extended or adjusted under 35 U.S.C. 154(b) by 10 days.

(21) Appl. No.: 16/775,678

(22) Filed: Jan. 29, 2020

(65) Prior Publication Data
US 2021/0231585 A1    Jul. 29, 2021

(51) Int. Cl.
*G01N 21/00* (2006.01)
*G01N 21/954* (2006.01)

(52) U.S. Cl.
CPC ... *G01N 21/954* (2013.01); *G01N 2021/9542* (2013.01); *G01N 2201/021* (2013.01); *G01N 2201/08* (2013.01)

(58) Field of Classification Search
CPC ........... A61B 90/50; A61B 1/00147; A61B 2017/2808; A61B 50/20; G02B 23/24; G02B 7/00; G02B 21/24; G02B 21/26; G01N 21/954; G01N 2021/9542; G01N 2201/021; G01N 2201/08
USPC ............ 356/241.1–241.6, 237.1–237.5, 244; 359/391; 600/124, 102, 121, 122, 101
See application file for complete search history.

(56) References Cited

U.S. PATENT DOCUMENTS

| | | | | |
|---|---|---|---|---|
| 4,765,732 A | * | 8/1988 | Enoch | A61B 3/02 351/237 |
| 7,833,150 B2 | * | 11/2010 | Yamamoto | A61B 90/57 600/102 |

* cited by examiner

*Primary Examiner* — Hoa Q Pham
(74) *Attorney, Agent, or Firm* — Stinson LLP

(57) ABSTRACT

A mount assembly includes a stage including a base and one or more sidewalls extending upward from the base to define an elongated channel, and a holder including an elongated body having a first end portion and a second end portion opposite the first end portion, a bracket extending upward from the elongated body at the first end portion, and a foot extending upward from the elongated body at the second end portion. The elongated body is positionable within the elongated channel. An inspection device is extendable between the bracket and the foot.

20 Claims, 4 Drawing Sheets

METHODS AND SYSTEMS FOR MOUNTING INSPECTION DEVICES

BACKGROUND

Known inspection devices may be inserted into one or more holes, openings, cavities, and/or small spaces to inspect at least some objects. To accurately inspect an object without affecting or damaging the object or the inspection device, at least some known inspection devices must be precisely moved and/or positioned. Some known inspection devices may be mounted to facilitate repeatable and reliable movement and/or positioning in one or more desired locations. Coupling such inspection devices to known mounts and/or calibrating such inspection devices, however, may be tedious, cumbersome, challenging, and/or time-consuming.

SUMMARY

Examples of the disclosure enable an inspection device to be mounted. In one aspect, a mount assembly is provided for use with an inspection device. The mount assembly includes a stage including a base and one or more sidewalls extending upward from the base to define an elongated channel, and a holder including an elongated body having a first end portion and a second end portion opposite the first end portion, a bracket extending upward from the elongated body at the first end portion, and a foot extending upward from the elongated body at the second end portion. The inspection device is extendable between the bracket and the foot. The elongated body is positionable within the elongated channel.

In another aspect, a system is provided. The system includes an inspection device including a control section and an elongated tube coupled to the control section, and a mount assembly coupleable to the inspection device. The mount assembly includes a stage including a base and one or more sidewalls extending upward from the base to define an elongated channel, and a holder including an elongated body having a first end portion and a second end portion opposite the first end portion, a bracket extending upward from the elongated body at the first end portion, and a foot extending upward from the elongated body at the second end portion. The elongated body is positionable within the elongated channel. The inspection device is extendable between the bracket and the foot.

In yet another aspect, a method is provided for mounting an inspection device. The method includes positioning a stage in a desired location. The stage includes a base and one or more sidewalls extending upward from the base to define an elongated channel. An elongated body of a holder is positioned in the elongated channel to couple the holder to the stage. The holder includes a bracket extending upward from a first end portion of the elongated body and a foot extending upward from a second end portion of the elongated body. The inspection device is extended between the bracket and the foot to couple the inspection device to the holder.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
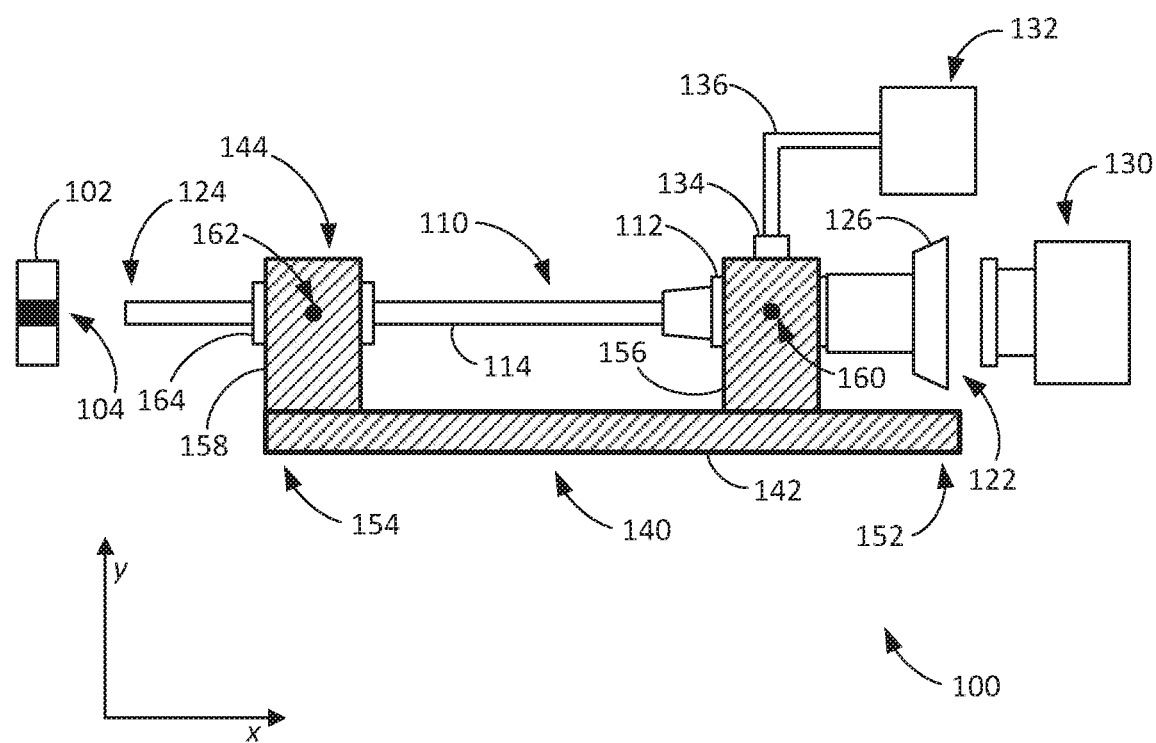
FIG. 1 is a schematic view of an example system for use in inspecting an object.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to mounting assemblies and, more particularly, to methods and systems for mounting inspection devices. Examples described herein include a stage and a holder coupled to the stage. The stage may include a base and a plurality of sidewalls extending upward from the base to define an elongated channel. The holder may include an elongated body positionable in the elongated channel of the stage, a bracket extending upward from a first end portion of the elongated body, and a foot extending upward from a second end portion of the elongated body. An inspection device may be extended between the bracket and the foot.

Examples described herein may be used to maintain or control the inspection device in any desired orientation or direction. Certain terminology is used to describe the examples in the present disclosure for convenience and reference only and not in a limiting sense. For example, the terms "upward," "upper," "vertical," "over," and the like designate directions in relation to the perspective shown in the drawings. While examples described herein are described such that the inspection device is coupleable to an upper portion of the mounting assembly, one of ordinary skill in the art would understand and appreciate that the example methods and systems may be used in various orientations. Moreover, while the examples described herein are described in regard to inspection devices, one of ordinary skill in the art would understand and appreciate that the example methods and systems may be used for mounting other devices.

FIG. 1 shows an example system 100 that may be used to inspect an object 102 including a small space, cavity, hole, and/or opening 104. Example objects may include, without limitation, a fuel injector, an engine cylinder, a motor, and/or a hydraulic manifold.

The object 102 may be inspected using an inspection device 110. In some examples, the inspection device 110 includes a control section 112 and an elongated tube 114 coupled to the control section 112. As shown in FIG. 1, the control section 112 may be at a proximal portion 122 of the inspection device 110, and the elongated tube 114 may extend longitudinally (e.g., along the X-axis) between the proximal portion 122 and a distal portion 124 of the inspection device 110. In some examples, the inspection device 110 is an optical or electrical inspection device including one or more lenses 126. Lenses 126 may be positioned, for example, at the proximal portion 122 (e.g., an eyepiece), at the distal portion 124 (e.g., an objective), and/or between the proximal portion 122 and distal portion 124 (e.g., a relay lens). In this manner, difficult-to-reach areas may be quickly, efficiently, and/or non-destructively inspected for porosities, cracks, abrasions, burrs, nicks, scratches, ridges, depressions, dings, dents, surface finishes, and the like. Example inspection devices 110 may include, without limitation, an endoscope, a borescope, and/or a videoscope.

The distal portion 124 of the inspection device 110 is positionable in or adjacent to the object 102 being inspected. At least a segment of the elongated tube 114 may be inserted into the opening 104, for example, to inspect the object 102. In some examples, a camera 130 is positioned at the proximal portion 122 of the inspection device 110 to capture one or more images of the object 102 through the inspection device 110. A light source 132 may be used to project light for use in illuminating the object 102 being inspected. In some examples, the light source 132 is coupled to the inspection device 110 (e.g., at the control section 112) using one or more connectors 134 via one or more optic cables or light guides 136. Light projected from the light source 132 may be channeled through the light guides 136 and to the inspection device 110 and/or object 102.

The inspection device 110 is coupleable to a mount assembly 140. The mount assembly 140 may be used, for example, to maintain or control a position and/or orientation of the inspection device 110. In some examples, the mount assembly 140 includes a stage 142 and a holder 144 coupled to the stage 142. As shown in FIG. 1, the stage 142 and holder 144 may each extend longitudinally (e.g., along the X-axis) between a proximal portion 152 of the mount assembly 140 and a distal portion 154 of the mount assembly 140.

In some examples, the holder 144 includes a bracket 156 and a foot 158 each extending generally upward (e.g., in a positive direction along the Y-axis) from the stage 142. As shown in FIG. 1, the bracket 156 may be positioned at the proximal portion 152 of the mount assembly 140, and the foot 158 may be positioned at the distal portion 154 of the mount assembly 140. Alternatively, the bracket 156 and/or foot 158 may be in any position and/or orientation that allows the holder 144 to function as described herein.

The inspection device 110 may be extended longitudinally (e.g., along the X-axis) between the bracket 156 and foot 158. As shown in FIG. 1, a first coupling mechanism 160 may be used to couple the control section 112 of the inspection device 110 to the bracket 156, and/or a second coupling mechanism 162 may be used to couple the elongated tube 114 of the inspection device 110 to the foot 158. Example coupling mechanisms may include, without limitation, a set screw, a bolt, a rivet, a screw, a nail, a rod, a pin, and/or any other coupling mechanism that couples a plurality of objects together. In some examples, the elongated tube 114 of the inspection device 110 is extended through an eccentric bushing 164, which is directly coupled to the foot 158.

Figure 2:
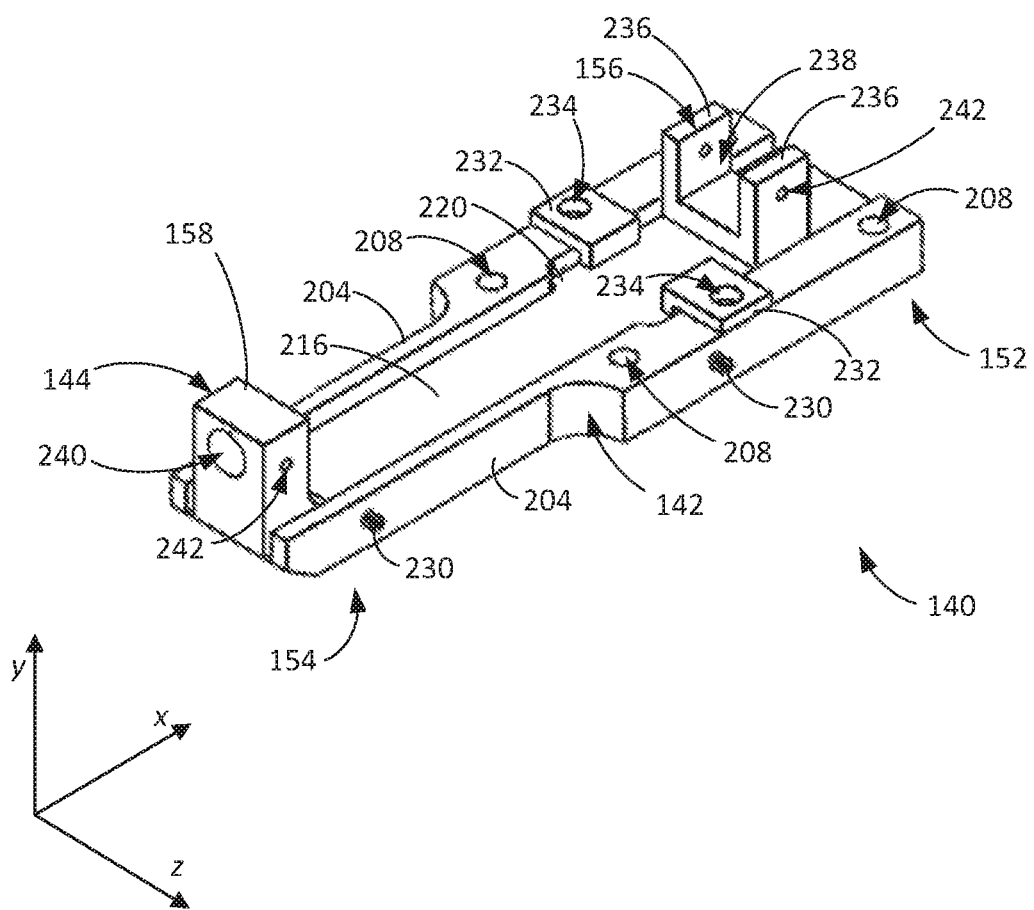
FIG. 2 is a perspective view of an example mount assembly that may be used in the system shown in FIG. 1.
Figure 3:
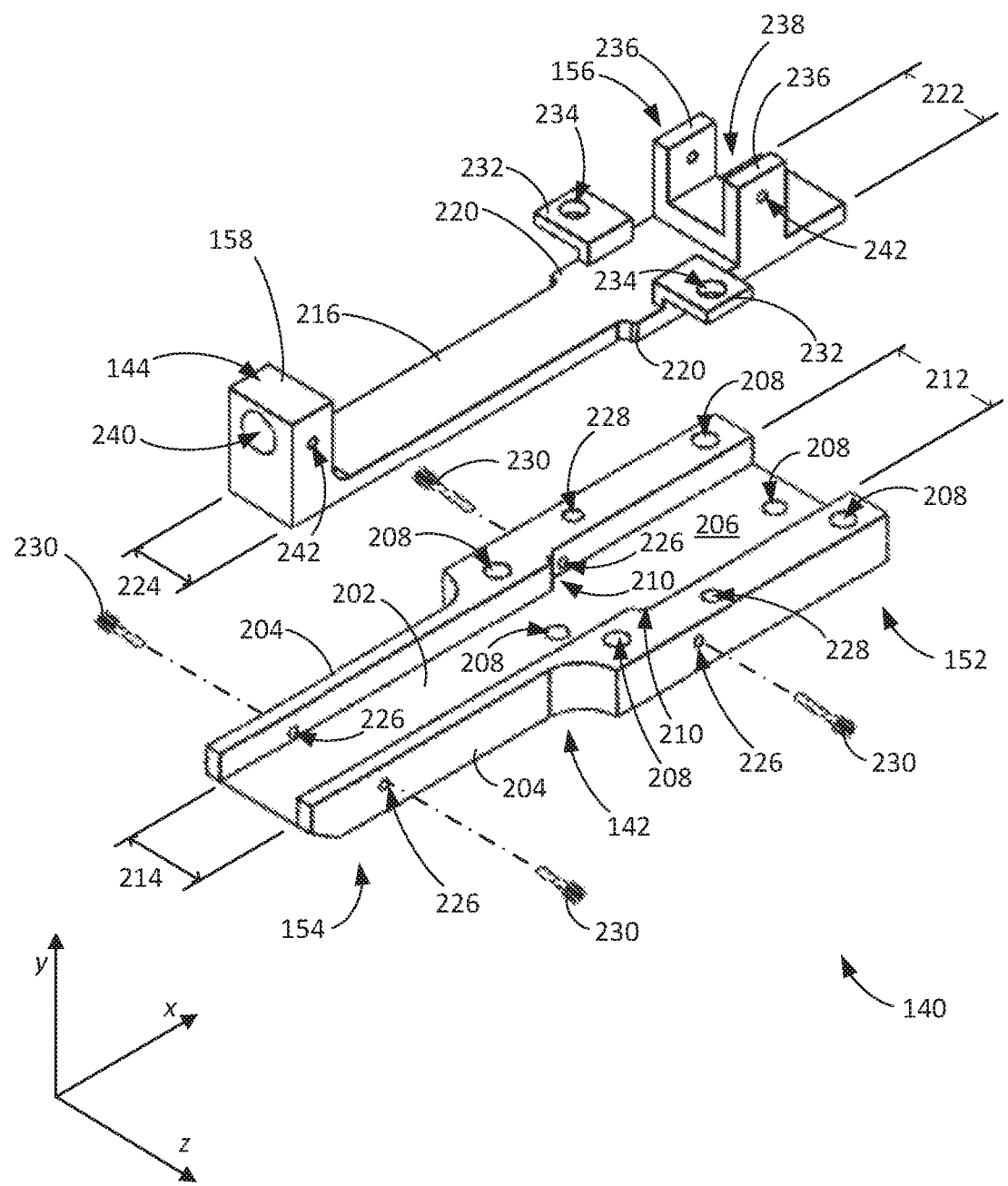
FIG. 3 is an exploded view of the mount assembly shown in FIG. 2.

FIGS. 2 and 3 show the example mount assembly 140 including a proximal portion 152 and a distal portion 154. The mount assembly 140 includes a stage 142 and a holder 144 removably coupled to the stage 142. As shown in FIG. 3, the stage 142 may include a base 202 and one or more sidewalls 204 extending generally upward (e.g., in a positive direction along the Y-axis) from the base 202 to define an elongated channel 206.

In some examples, the mount assembly 140 includes one or more openings 208 defined therethrough to facilitate coupling the mount assembly 140 to another object (e.g., a jig, a fixture, or other supporting structure). A coupling mechanism (e.g., set screw, bolt, rivet, screw, nail, rod, pin, etc.) may be extended through an opening 208 to couple the stage 142 to the other object. In this manner, a position and/or orientation of the mount assembly 140 may be maintained and/or secured. Alternatively, the mount assembly 140 may be maintained and/or secured using any other mechanism that allows the system 100 to function as described herein. As shown in FIGS. 2 and 3, the openings 208 may extend generally vertically (e.g., along the Y-axis) through the base 202 and/or sidewalls 204. Alternatively, the openings 208 may be oriented to extend in any direction that allows the mount assembly 140 to function as described herein. In some examples, the object 102 and stage 142 are coupled to the other object such that a position of the object 102 relative to the stage 142 is fixed.

In some examples, the sidewalls 204 are stepped to define a nook 210 (shown in FIG. 3) in the elongated channel 206. The sidewalls 204 may be spaced apart, for example, a first distance 212 (shown in FIG. 3) at the proximal portion 152 of the mount assembly 140 and a second distance 214 (shown in FIG. 3) at the distal portion 154 of the mount assembly 140. As shown in FIGS. 2 and 3, the second distance 214 may be less than the first distance 212. Alternatively, the second distance 214 may be greater than or equal to the first distance 212.

The holder 144 includes an elongated body 216 that is sized, shaped, and/or configured to be positioned within the elongated channel 206. In some examples, the elongated body 216 has a shoulder 220 that complements or fits within the nook 210. For example, the elongated body 216 may have a first width 222 (shown in FIG. 3) corresponding to the first distance 212 between the sidewalls 204 at the proximal portion 152 of the mount assembly 140 and/or a second width 224 (shown in FIG. 3) corresponding to the second distance 214 between the sidewalls 204 at the distal portion 154 of the mount assembly 140. In some examples, the first width 222 and/or second width 224 is approximately 2.0 millimeters (approximately 0.07874 inch) narrower than the first distance 212 and/or second distance 214, respectively. As shown in FIGS. 2 and 3, the second width 224 may be narrower than the first width 222. Alternatively, the second width 224 may be wider than or equal to the first width 222 (e.g., if the second distance 214 were greater than or equal to the first distance 212).

In some examples, the stage 142 includes one or more first openings 226 (shown in FIG. 3) and/or second openings 228 (shown in FIG. 3) defined therethrough to facilitate coupling the stage 142 to the holder 144. A coupling mechanism 230 (e.g., jack bolt, set screw, bolt, rivet, screw, nail, rod, pin, etc.) may be extended through a first opening 226 and/or second opening 228 to couple the stage 142 to the holder 144. In this manner, a relative position and/or orientation of the stage 142 and holder 144 may be maintained and/or secured. Alternatively, the stage 142 and/or holder 144 may be maintained and/or secured using any other mechanism that allows the mount assembly 140 to function as described herein. In some examples, the first openings 226 and second openings 228 extend generally perpendicular to each other. For example, as shown in FIGS. 2 and 3, the first openings 226 may extend generally laterally (e.g., along the Z-axis) through the sidewalls 204, and the second openings 228 may extend generally vertically (e.g., along the Y-axis) through the sidewalls 204. Alternatively, the first openings 226 and/or second openings 228 may be oriented to extend in any direction that allows the stage 142 to function as described herein.

In some examples, the holder 144 includes one or more wings 232 extending generally laterally (e.g., along the Z-axis) from the elongated body 216 to facilitate coupling the holder 144 to the stage 142. As shown in FIGS. 2 and 3, the wings 232 may extend generally upward (e.g., in a positive direction along the Y-axis) and outward (e.g., in opposite directions along the Z-axis) from the elongated body 216. In this manner, at least a portion of the wings 232 may clear and/or extend over the sidewalls 204 when the elongated body 216 is positioned within the elongated channel 206.

In some examples, the holder 144 includes one or more openings 234 defined therethrough to facilitate coupling the holder 144 to the stage 142. A coupling mechanism (e.g., set screw, bolt, rivet, screw, nail, rod, pin, etc.) may be extended through an opening 234 to couple the holder 144 to the stage 142. In this manner, a relative position and/or orientation of the stage 142 and holder 144 may be maintained and/or secured. Alternatively, the stage 142 and/or holder 144 may be maintained and/or secured using any other mechanism that allows the mount assembly 140 to function as described herein. In some examples, the openings 234 are positioned and/or oriented to extend generally in alignment with the first openings 226 and/or second openings 228 when the elongated body 216 is positioned within the elongated channel 206. For example, as shown in FIGS. 2 and 3, the openings 234 may extend generally vertically (e.g., along the Y-axis) through the wings 232. Alternatively, the openings 234 may be oriented to extend in any direction that allows the holder 144 to function as described herein.

The holder 144 includes a bracket 156 and a foot 158 for use in coupling the mount assembly 140 to one or more inspection devices 110 (shown in FIG. 1). An inspection device 110 may be extended, for example, between the bracket 156 and foot 158. As shown in FIGS. 2 and 3, the bracket 156 may extend generally upward (e.g., in a positive direction along the Y-axis) from a first end portion of the elongated body 216 (e.g., at the proximal portion 152 of the mount assembly 140), and the foot 158 may extend generally upward (e.g., in a positive direction along the Y-axis) from a second end portion of the elongated body 216 (e.g., at the distal portion 154 of the mount assembly 140).

In some examples, the bracket 156 includes a plurality of arms 236 defining a space 238 therebetween. For example, the bracket 156 may be a U-shaped bracket. As shown in FIGS. 2 and 3, the bracket 156 may be oriented such that the arms 236 are laterally spaced (e.g., along the Z-axis) from each other. Alternatively, the bracket 156 may be in any position and/or orientation that allows the mount assembly 140 to function as described herein.

The foot 158 defines an opening 240 therethrough. In some examples, the opening 240 is configured to receive a bushing (e.g., eccentric bushing 164) therein. As shown in FIGS. 2 and 3, the foot 158 may be oriented such that the opening 240 extends generally longitudinally (e.g., along the X-axis) through the foot 158. Alternatively, the foot 158 may be in any position and/or orientation that allows the mount assembly 140 to function as described herein. In some examples, the foot 158 is an angle bracket.

In some examples, the bracket 156 is configured to support the control section 112 of the inspection device 110, and/or the foot 158 is configured to support the elongated tube 114 of the inspection device 110. For example, the control section 112 may be positioned or received in the space 238 defined between the arms 236 of the bracket 156, and/or the elongated tube 114 may be extended or received in the opening 240 defined in the foot 158.

In some examples, the holder 144 includes one or more openings 242 defined therethrough to facilitate coupling the holder 144 to the inspection device 110. A coupling mechanism (e.g., first coupling mechanism 160, second coupling mechanism 162) may be extended through an opening 242 to couple the holder 144 to the inspection device 110. In this manner, a relative position and/or orientation of the inspection device 110 and holder 144 may be maintained and/or secured. Alternatively, the inspection device 110 and/or holder 144 may be maintained and/or secured using any other mechanism that allows the system 100 to function as described herein. As shown in FIGS. 2 and 3, the openings 242 may extend generally laterally (e.g., along the Z-axis) through the bracket 156 and foot 158. Alternatively, the openings 242 may be oriented to extend in any direction that allows the system 100 to function as described herein.

Figure 4:
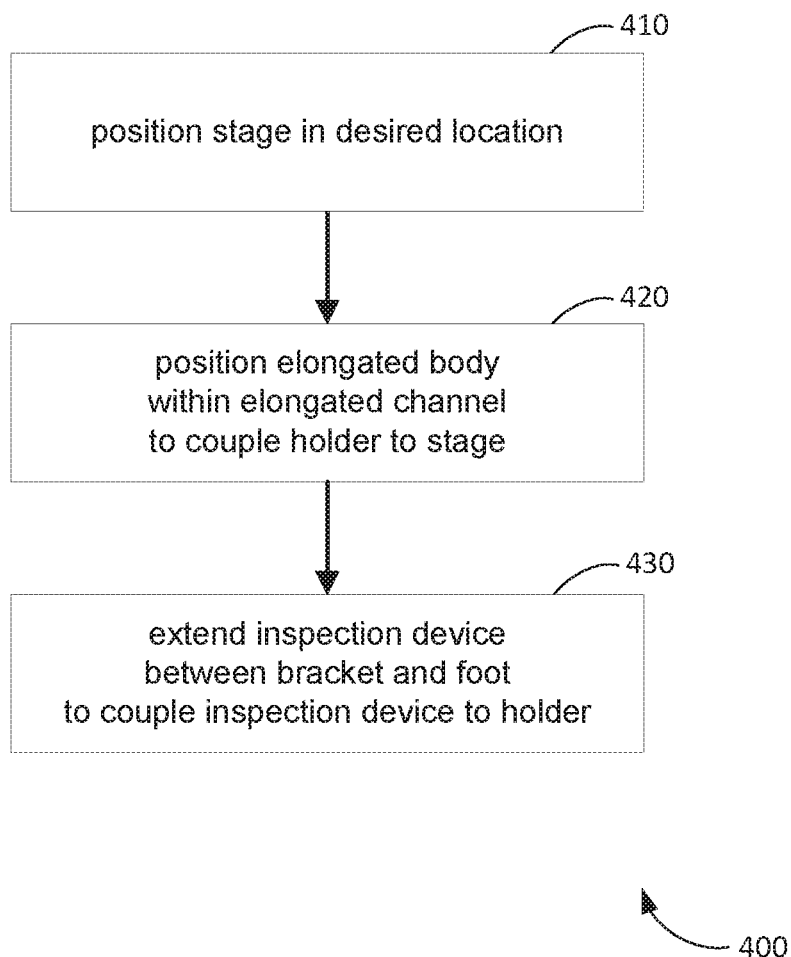
FIG. 4 is a flowchart of an example method of mounting an inspection device.

FIG. 4 shows an example method 400 of mounting an inspection device 110. The inspection device 110 may be mounted, for example, using a mount assembly 140. In some examples, the inspection device 110 is mounted after procuring, maintaining, and/or repairing the inspection device 110.

The method 400 includes positioning a stage 142 in a desired location at operation 410. The stage 142 includes a base 202 and one or more sidewalls 204 extending generally upward (e.g., in a positive direction along the Y-axis) from the base 202 to define an elongated channel 206. To maintain or secure a position and/or orientation of the stage 142, the stage 142 may be coupled to a fixture or other supporting structure. In some examples, the stage 142 is securely coupled to a fixture by extending one or more coupling mechanisms through one or more openings 208 defined in the base 202 and/or sidewalls 204. Additionally, the object 102 may be securely coupled to the fixture such that a position of the object 102 relative to the stage 142 is fixed.

An elongated body 216 of a holder 144 is positioned within the elongated channel 206 at operation 420 to couple the holder 144 to the stage 142. The elongated body 216 may be oriented, for example, to extend longitudinally (e.g., along the X-axis) within the elongated channel 206. In some examples, the holder 144 is positioned such that a shoulder 220 of the holder 144 abuts or is positioned adjacent the sidewalls 204 of the stage 142. The shoulder 220 may contact or engage the sidewalls 204 at the nook 210, for example, to facilitate securing a relative positioning of the stage 142 and holder 144. For example, when the shoulder 220 contacts or engages the sidewalls 204 at the nook 210, the holder 144 may be restricted or prevented from moving distally (e.g., in negative direction along the X-axis).

In some examples, the holder 144 is positioned such that one or more wings 232 of the holder 144 extend over the sidewalls 204 of the stage 142. In some examples, one or more coupling mechanisms are extended through one or more first openings 226, second opening 228, and/or openings 234 to securely couple the stage 142 to the holder 144. For example, one or more coupling mechanisms 230 may be used to push the holder 144 into a desired position and/or orientation, and/or to maintain the holder 144 in the desired position and/or orientation. In some examples, the coupling mechanisms 230 are selectively moved to finely adjust the position and/or orientation of the holder 144 within the elongated channel 206.

The holder 144 includes a bracket 156 and a foot 158 extending generally upward (e.g., in a positive direction along the Y-axis) when the holder 144 is coupled to the stage 142. An inspection device 110 is extended between the bracket 156 and foot 158 of the holder 144 at operation 430 to couple the inspection device 110 to the holder 144. A control section 112 of the inspection device 110 may be positioned in a space 238 defined between the arms 236 of the bracket 156, and an elongated tube 114 of the inspection device 110 may be extended through an opening 240 defined in the foot 158. In some examples, the elongated tube 114 is extended through an eccentric bushing 164 positioned in the opening 240.

The holder 144 is configured to attach to the inspection device 110 in a consistent, repeatable manner. For example, a first coupling mechanism 160 and/or second coupling mechanism 162 may be extended through a respective opening 242 to securely couple the inspection device 110 to the holder 144. A distal portion 124 of the inspection device 110 may be positioned in or adjacent to an object 102 being inspected. A camera 130 may be positioned at the proximal portion 122 of the inspection device 110 to capture one or more images of the object 102 through the inspection device 110. In some examples, a light source 132 is coupled the inspection device 110 (e.g., at the control section 112) using one or more connectors 134.

In some examples, coupling mechanisms are moveable to selectively increase or decrease an applied pressure. For example, one or more coupling mechanisms (e.g., coupling mechanism 230) may be moved to selectively increase a pressure applied to the holder 144 for securely coupling the holder 144 to the stage 142. Conversely, one or more coupling mechanisms (e.g., coupling mechanism 230) may be moved to selectively decrease the pressure applied to the holder 144 such that the holder 144 may be uncoupled and/or removed from the stage 142. In some examples, the elongated tube 114 of the inspection device 110 may be withdrawn or uncoupled from the eccentric bushing 164 positioned in the opening 240 to uncouple the inspection device 110 from the mount assembly 140 without uncoupling the eccentric bushing 164 from the foot 158.

The stage 142 and holder 144 are configured to position the inspection device 110 with respect to the object 102 in a consistent, repeatable manner. Alternatively, one or more coupling mechanisms (e.g., coupling mechanism 230) may be moved to selectively increase or decrease a pressure applied to the holder 144 at one or more corresponding locations for adjusting the position and/or orientation of the holder 144 within the elongated channel 206. In this manner, the coupling mechanisms may be moved to calibrate the inspection device 110 by finely adjusting the position and/or orientation of the holder 144.

Example mount assemblies are described herein and illustrated in the accompanying drawings. This written description uses examples to disclose aspects of the disclosure and also to enable a person skilled in the art to practice the aspects, including making or using the above-described systems and executing or performing the above-described methods. Examples described herein may be used to efficiently and quickly couple and/or uncouple an inspection device from a mount assembly while maintaining positional accuracy, precision, and/or repeatability.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, manufacturing and/or testing equipment.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mount assembly for use with an inspection device, the mount assembly comprising:
   a stage including a base and one or more sidewalls extending upward from the base to define an elongated channel; and
   a holder including an elongated body having a first end portion and a second end portion opposite the first end portion, a bracket extending upward from the elongated body at the first end portion, and a foot extending upward from the elongated body at the second end portion, wherein the inspection device is extendable between the bracket and the foot, the elongated body positionable within the elongated channel.

2. The mount assembly of claim 1, wherein the one or more sidewalls of the stage are spaced apart a first distance at the first end portion and spaced apart a second distance at the second end portion, the second distance less than the first distance.

3. The mount assembly of claim 1, wherein the base of the stage includes one or more openings defined therethrough.

4. The mount assembly of claim 1, wherein the one or more sidewalls of the stage each includes one or more openings defined therethrough.

5. The mount assembly of claim 1, wherein the one or more sidewalls of the stage each includes one or more first openings defined therethrough and one or more second openings defined therethrough, the one or more first openings perpendicular to the one or more second openings.

6. The mount assembly of claim 1, wherein the bracket of the holder is a U-shaped bracket.

7. The mount assembly of claim 1, wherein the foot of the holder includes an opening defined therethrough.

8. The mount assembly of claim 7, further comprising an eccentric bushing positionable in the opening.

9. The mount assembly of claim 1, wherein the foot of the holder is an angle bracket.

10. The mount assembly of claim 1, wherein the holder includes one or more wings extending laterally from the elongated body.

11. The mount assembly of claim 10, wherein the one or more wings of the holder each include an opening defined therethrough.

12. A system comprising:
   an inspection device including a control section and an elongated tube coupled to the control section; and
   a mount assembly coupleable to the inspection device, the mount assembly comprising:
      a stage including a base and one or more sidewalls, the one or more sidewalls extending upward from the base to define an elongated channel; and
      a holder including an elongated body, a bracket coupled to the elongated body, and a foot coupled to the elongated body, the elongated body having a first end portion and a second end portion opposite the first end portion, the bracket extending upward from the elongated body at the first end portion, the foot extending upward from the elongated body at the second end portion, wherein the elongated body positionable within the elongated channel, and wherein the inspection device is extendable between the bracket and the foot.

13. The system of claim 12, wherein the one or more sidewalls of the stage are spaced apart a first distance at the first end portion and spaced apart a second distance at the second end portion, the second distance less than the first distance.

14. The system of claim 12, further comprising an eccentric bushing, wherein the foot of the holder includes an opening defined therethrough, and the eccentric bushing is positionable in the opening.

15. The system of claim 12, wherein the holder includes one or more wings extending laterally from the elongated body.

16. A method of mounting an inspection device, the method comprising:
   positioning a stage in a desired location, the stage including a base and one or more sidewalls extending upward from the base to define an elongated channel; and
   positioning an elongated body of a holder in the elongated channel to couple the holder to the stage, the holder including a bracket extending upward from a first end portion of the elongated body and a foot extending upward from a second end portion of the elongated body; and
   extending the inspection device between the bracket and the foot to couple the inspection device to the holder.

17. The method of claim 16, wherein positioning the elongated body of the holder further comprises positioning a shoulder of the holder adjacent to the one or more sidewalls of the stage at a nook.

18. The method of claim 16, wherein positioning the elongated body of the holder further comprises extending one or more wings of the holder over the one or more sidewalls of the stage.

19. The method of claim 16, wherein positioning the elongated body of the holder further comprises moving one or more coupling mechanisms to calibrate the inspection device.

20. The method of claim 16, wherein extending the inspection device further comprises:
   positioning a control section of the inspection device in a space defined by the bracket; and
   extending an elongated tube of the inspection device through an opening defined in the foot.

\* \* \* \* \*